March 21, 1939. J. KARG Re. 21,034

MEANS FOR AUTOMATIC EXPOSURE CONTROL

Original Filed June 5, 1935 2 Sheets-Sheet 1

Josef Karg
INVENTOR.

Newton M. Perrins
BY Rollo M. Carter
ATTORNEYS.

MEANS FOR AUTOMATIC EXPOSURE CONTROL

Original Filed June 5, 1935 2 Sheets-Sheet 2

Josef Karg
INVENTOR.

BY Newton M. Perrins
Robert H. Carter
ATTORNEYS.

Reissued Mar. 21, 1939 Re. 21,034

UNITED STATES PATENT OFFICE 21,034

MEANS FOR AUTOMATIC EXPOSURE CONTROL

Josef Karg, Vienna, Germany, assignor, by direct and mesne assignments, to Eastman Kodak Company, Rochester, N. Y., a corporation of New Jersey Original No. 2,061,909, dated November 24, 1936, Serial No. 25,080, June 5, 1935. Application for reissue December 8, 1938, Serial No. 244,698. In Austria June 9, 1934

15 Claims. (Cl. 95—64)

The present invention relates to a novel means for controlling the degree of exposure in photographic apparatus and more particularly to a system and method of automatic or semi-automatic exposure control utilizing a light responsive electric element serving for controlling or actuating an exposure control mechanism.

One object of the invention is to provide an automatic exposure control mechanism for photographic cameras controlled by a photoelectric element adapted to supply the requisite controlling energy for adjusting an element capable of controlling the degree of exposure.

Another object of the invention is the provision of automatic or semi-automatic exposure control means for photographic apparatus in which the controlling action is effected by means of an electric light sensitive element without requiring an outside source of electrical stimulation, such as a battery.

Another object of the invention is the provision of an exposure control mechanism for photographic cameras whereby the operator may choose a desired diaphragm opening or stop value to suit special requirements, such as depth of focus and whereby a corresponding shutter speed is adjusted automatically dependent on existing light conditions.

Another object of the invention is the provision of an automatic exposure control mechanism for photographic cameras whereby the photographer is enabled to choose a desired shutter speed to suit special conditions, such as the speed of movement of the object to be photographed and whereby the diaphragm opening or stop is automatically adjusted dependent on the existing light values of the subject or scene being photographed.

A further object of the invention is the provision of means in a photographic camera equipped with automatic or semi-automatic exposure control, whereby the operator is apprised of the impossibility of securing a correctly exposed picture under the existing light or other exposure determining conditions, such as speed of movement, of the object to be photographed, etc.

A further object of the invention is the provision of means in a photographic camera, especially of the type equipped with automatic exposure control, whereby operation of the camera and the carrying out of an exposure is automatically prevented under existing unfavorable conditions of light or other exposure determining conditions.

Another object of the invention is to provide an automatic exposure control mechanism for photographic cameras in which the photoelectric element or other light evaluating device serves to preset an exposure control element such as an iris diaphragm while the final adjustment is carried out by the operator when making the exposure by operating an exposure release element.

A further object of the invention is the provision of indicating means in connection with an automatic exposure control mechanism for photographic cameras wherein a light responsive element serves to preset an automatically adjusted exposure controlling element in accordance with prevailing light conditions and the setting of a manually adjustable correlated exposure control element in such a manner that by subsequent operation of the camera shutter, said first exposure control element is automatically adjusted to secure a correct exposure, whereby said indicating means serve to apprise the operator of the value or adjustment of the automatically adjusted exposure control means prior to the initiation of the exposure so as to enable the photographer to set the manually operated exposure control element to suit special requirements as depth of focus, speed of the object to be photographed, etc.

The above and further objects of the invention and novel aspects thereof will become more apparent from the following detailed description taken with reference to the accompanying drawings wherein I have illustrated several embodiments of automatic exposure control means and associate apparatus according to the invention.

Figure 1:
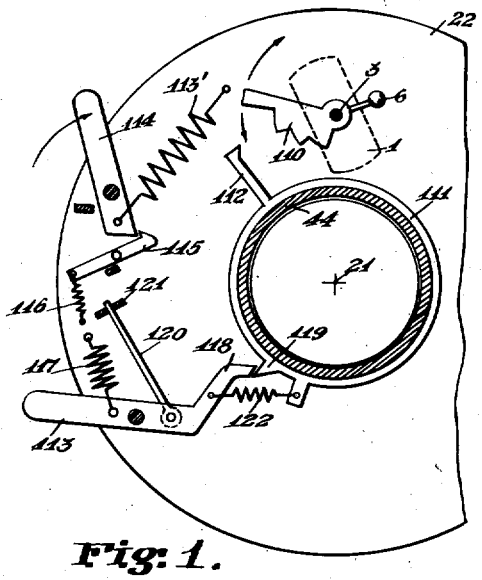
Fig. 1 illustrates diagrammatically an automatic control mechanism, in accordance with the improvements of the invention, connected with an iris diaphragm device.
Figure 9:
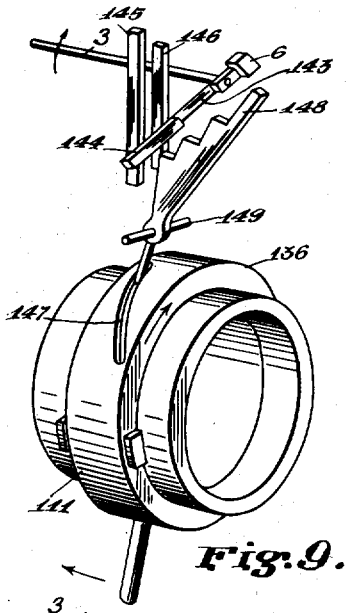
Figure 7:
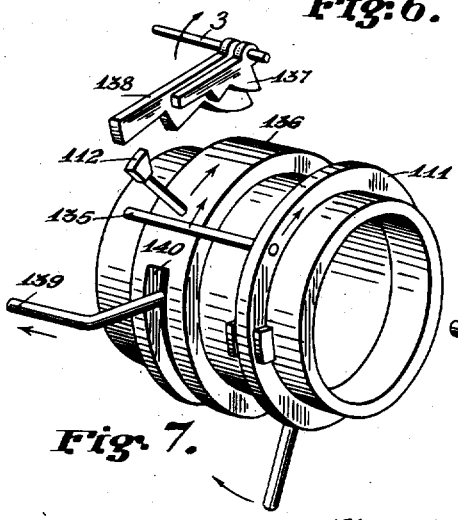
Figure 8:
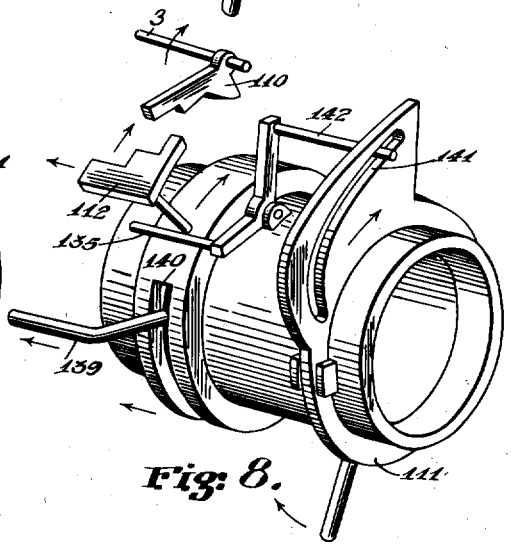
Figure 10:
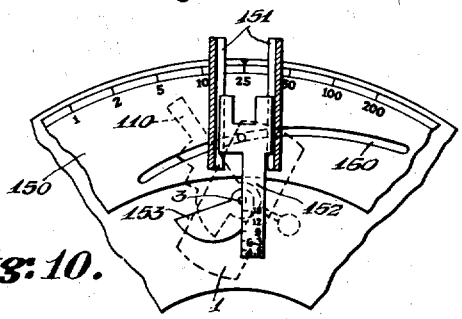

Figures 7 to 9 illustrate further improvements of an exposure control mechanism of the type shown in Figure 1 wherein the automatic adjustment of the diaphragm opening is variably modified in accordance with predetermined shutter speeds to be selected and manually adjusted by the operator; and Figure 10 shows means embodied in an automatic exposure control mechanism described by the previous figures for indicating the adjustment of the speed and diaphragm apertures in advance to apprise the operator of the setting of the automatic exposure control mechanism upon subsequent operation of the shutter.

Similar reference numerals denote similar parts throughout the different views of the drawings.

Figure 2:
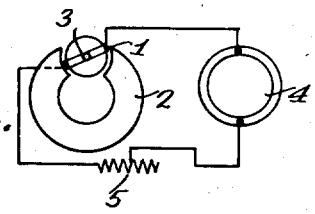
Fig. 2 is a wiring diagram showing the connection of the photoelectric cell and electromagnetic control device serving for presetting the iris control as illustrated in Fig. 1.

Referring to Figures 1 and 2 of the drawings, I have shown therein in a diagrammatical manner an embodiment of an automatic diaphragm or stop control mechanism in its simplest form in accordance with the invention. The electromagnetic actuating device shown comprises a moving coil 1 disposed in a known manner between the poles of a permanent magnet 2 and pivoted about an axis 3. The moving coil, which may be of the type provided in the known D'Arsonval galvanometer, is energized directly from a photo-electric element 4, preferably of the type adapted to generate the requisite electrical energy for operating the moving coil without the aid of an additional electrical stimulation, such as a battery. Photo-electric devices of this type, known as photovoltaic cells, especially those of the barrier plane type, are primarily suited for the purpose of my invention, and consist substantially of a metal base coated with a thin layer of light sensitive semi-conducting material, such as crystalline selenium, cuprous oxide and the like, and a translucent conductive covering layer firmly applied to the light sensitive layer. If light rays are impinged upon the light sensitive material passing through the translucent cover, a potential difference is generated between the base plate and the covering layer whereby the moving coil is deflected at varying angles, dependent on the voltage or current generated by the photo-electric element which is in turn proportional to the amount of incident light impinged upon the light sensitive surface. The photo-electric element as described is mounted on the camera body in a suitable manner so as to be exposed to the same light rays reflected from the subject or scene to be photographed in the picture taking position of the camera.

In order to take account of the exposure speed and the sensitivity of the negative material, such as the film or plate used, an electrical resistance 5 may be connected in the circuit of the photo-electric element as shown in Figure 2.

According to my invention I provide an element having low mass controlled by the light sensitive system to serve as a stop or abutment for the diaphragm control. This abutment element may, for instance, be directly connected to the moving coil of the electromagnetic device. In addition, I provide means, such as a clamping arrangement, for holding the exposure control or abutment element in a fixed position during the exposure period beginning with the operation of the shutter release and the initiation of the exposure. This exposure controlling element may consist of a leaf or vane pivotally mounted about an axis through its center of gravity by means of frictionless bearings, such as by a direct connection to the shaft of the moving coil device. This controlling vane should consist of light material and serves as a variable stop or abutment for limiting the movement of the iris diaphragm or other exposure controlling element as will be described hereafter. An arrangement of this type of exposure control insures the advantage of both ready response to slight impulses before the beginning of the exposure and great mechanical resistance during the shutter operation.

Figure 3:
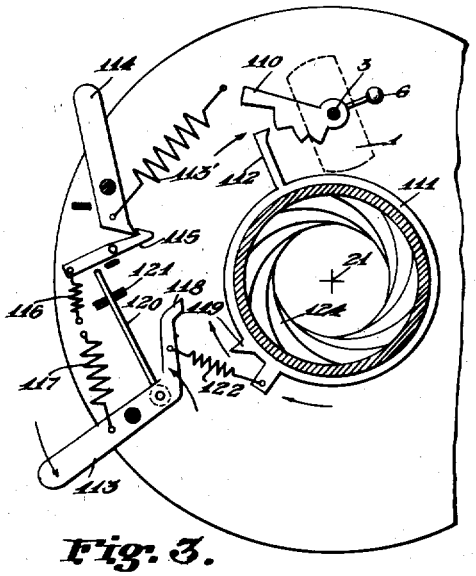
Figs. 3 and 4 illustrate the mechanism according to Fig. 1 in an intermediate and final position, respectively, when making an exposure by operating the shutter or exposure release of the camera.
Figure 4:
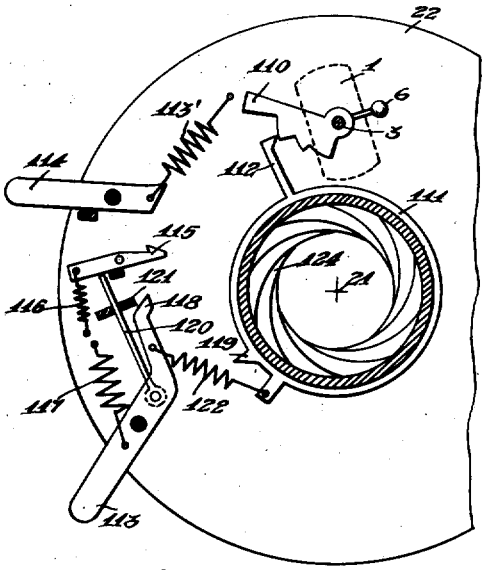

In the drawings Figures 1, 3 and 4 which are sections taken between the front lens and diaphragm setting ring of a shutter connected with the lens mount in a known manner, I have shown an abutment vane in the form of stepped disk 110 suitably balanced, such as by means of the counterweight 6 and carried by the moving coil 1. The diaphragm setting ring 111 carries a finger 112 which in the normal position, i. e. when the diaphragm is fully open, is out of engagement with the stepped disk or vane 110. Thus the latter may move freely as long as the shutter release lever 113 is not operated and may follow readily any variation of the photo-electric current in such a manner that its position is determined by the excitation of the photo-electric element depending on the prevailing light conditions. The arrangement is such that with the photo-electric element in its dark or unexcited condition, the highest step of the vane 110 has a position opposite the finger 112 and that with increasing excitation the next following steps, and with the maximum excitation of the photo-electric element, the lowest step of the vane 110 will be opposite the finger 112. In the drawings I have only shown four steps for the sake of simplicity, and it is understood that the number of steps may be increased to secure any desired degree of accuracy. The winding of the shutter by pushing upward the winding lever 114 does not interfere with the free movement of the vane. The position shown in Figure 1 corresponds to the wound condition of the shutter spring 113'. A locking lever 115 serves to prevent a premature operation by action of a spring 116. The shutter release lever 113 is shown in its normal or resting position in which it is held by the action of spring 117. The release lever is provided with an extension finger 118 engaging a nose 119 of the diaphragm setting ring 111, thus preventing the latter from prematurely leaving its initial or normal position. The release lever 113 furthermore carries a pin 120 pivotally mounted thereon and arranged to move in a guide 121 in such a manner as to unlock the lever 115 after moving a predetermined distance. Figure 3 shows the mechanism in a position shortly prior to, and Figure 4 shows the position immediately following the release of the shutter. The spring 122 serves to provide an elastic connection between the shutter release lever and the diaphragm setting ring. This spring is tensioned by the operation of the shutter release lever, whereby the finger 118 is disengaged from the nose 119 in such a manner as to enable the diaphragm setting ring to leave its normal position by the action of spring 122, and to close the diaphragm as shown at 124 in Figure 3 until the finger 112 of the diaphragm setting ring engages one of the steps of the vane 110 dependent on the existing excitation of the photo-electric element. In this manner the vane 110, and with it the moving coil, will remain locked until the shutter release lever has returned to its normal position. The height of the separate steps is designed in such a manner that the aperture of the iris diaphragm adjusted in each case is related to the illumination of the photo-electric cell according to a linear law. In order to keep the dimensions of the stepped disk within practical limits, it is advisable to reduce the maximum angular movement of the finger 112 relative to the maximum rotational movement of the iris diaphragm, such as by a suitable coupling with a corresponding transmission ratio connecting the diaphragm 124 with the setting ring 111. The length of the release pin 120 is designed in such a manner that with the engagement of the finger 112 with the lowest step of the vane 110, the adjustment of the diaphragm has been completed before the lever 115 is unlocked by the pin 120. The elastic connection between the shutter release lever and the diaphragm setting ring has the effect that the release lever may be moved until unlocking the lever 115 even after the finger 112 has engaged a step of the vane 110. In addition, the spring 122 serves for relieving the axis of the moving coil from lateral pressure exerted during the operation of the release lever. Whenever the lever 113 is released after operation of the shutter, it will return to its initial position through the action of the spring 117. Simultaneously the spring 122 is compressed, whereby the finger 118 of the release lever re-engages the nose 119 of the diaphragm setting ring, thus returning the iris diaphragm to its normal position at full aperture. In order to prevent the diaphragm from opening due to a premature release of the release lever during the exposure period, a suitable locking element, not shown in the drawings, may be provided for blocking the movement of the release lever during the return movement of the winding lever 114 from its operating position to its normal position.

Figure 5:
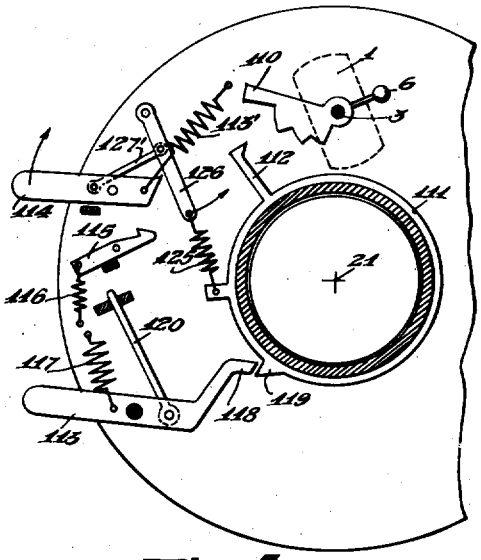
Figures 5 and 6 show modified constructions of a device of the type illustrated by Figure 1.

Referring to Figure 5, I have shown a modified arrangement wherein the connection by the spring 122 is omitted. In this case the diaphragm setting ring 111 is connected with a lever 126 through a spring 125 being untensioned when the shutter is in its unwound condition. The lever 126 is connected with the shutter winding lever 114 through a linkage element shown at 127'. Thus, the spring 125 is tensioned together with the spring 113' by the operation of the lever 114 and in its tensioned condition is opposed by the stronger force of the spring 117 as long as the shutter release lever 113 remains in the normal position. If the shutter release lever is depressed, the tensioned spring 125 acts to pull the diaphragm into its operating position similarly as described in connection with Figures 1, 3 and 4. The advantage of this construction is the fact that with the spring 125 in its untensioned condition, a closing of the diaphragm is prevented, thus preventing unnecessary operations of the diaphragm mechanism and wear on the moving coil device by accidental operation of the release lever when the shutter is in its unwound condition.

Figure 6:
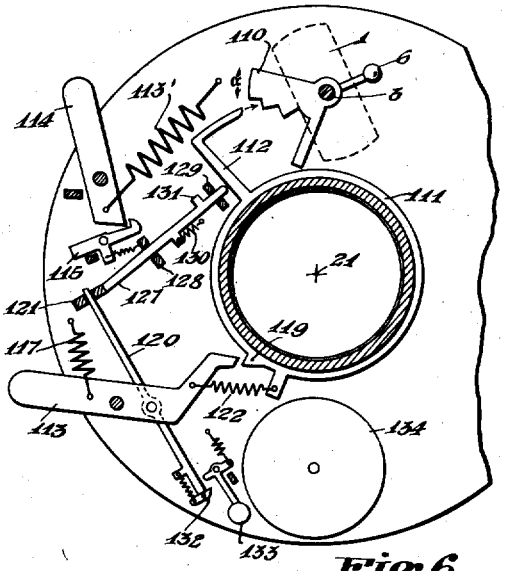

If the prevailing light conditions are insufficient for making a proper exposure, the release of the shutter is automatically blocked by a mechanism of modified construction as shown in Figure 6. In the latter the guide 121 for the release pin 120 is mounted on a rod 127 arranged to slide within a pair of guides 128 and 129. A spring 130 tends to press the rod 127 against the diaphragm adjusting finger 112 in such a manner that the rod will follow the movement of the finger under the influence of the spring 130 until stopped by a projection 131 of the guide 129. The construction of the vane 110 is such that its first and its last step are so dimensioned as to prevent a displacement of the rod 127. Thus, if at the moment of operating the release lever, the moving coil has assumed such a position that one of the end steps of the vane 110 is opposite the finger 112, the guide 121 will remain in the position as shown in the drawings. The release pin will therefore move past the locking lever 115, thus preventing a release of the shutter. At the same time a bell signal is produced in that an extension of the release pin 120 engages a clapper 133 with its nose 132 actuating a bell 134. In every other position of the vane 110, the release pin 120 due to the changed position of the guide 121 engages the locking lever 115, and causes a shutter release. At the same time the path of the nose 132 is changed so as to prevent engagement with the clapper and accordingly the operation of the alarm. The first abutment step of the vane 110 engaging the finger 112 in the non-excited or dark condition of the photo-electric element is preferably designed with a sufficiently large angle as shown at $\alpha$ in the drawings so as to engage the finger 112 already at low excitation values of the photo-electric element in which case a lens of greater relative opening or "speed" would be required to secure a fully exposed picture. In this case the second step of the vane 110 would correspond to full lens opening and the closing of the diaphragm started beginning with the third step.

In Figure 7 I have shown a mechanism for automatically modifying the operation of the abutment vane in accordance with manual adjustments of a correlated exposure control element, in the example described, the shutter speed setting adjusted by the photographer. In this and the following figures the camera shutter has not been shown for the sake of simplicity and clarity of illustration. It is understood that both with regard to the present and previous exemplifications illustrated, the invention may be practiced in connection with any type of central or focal plane shutter.

Referring to Figure 7, I have shown an actuating arm 135 carried by the diaphragm setting ring 111. The diaphragm adjusting finger 112 in this constructional embodiment is connected to an intermediate member arranged for both rotational and axial movement. The stepped vane in this embodiment consists of as many separate elements connected to each other and differing from each other as to the height and/or number of the steps as there are values for the manually adjusted control element viz., shutter speed values in the example described. In the drawings, I have only shown two vane elements 137 and 138 mounted upon the moving coil shaft 1, but it will be understood that any number of such elements may be provided to secure any desired number of shutter speed adjustments. By operating the lever 139 for adjusting the correlated exposure control element such as the shutter speed, the intermediate member 136 is displaced parallel to the lens axis in such a manner that the finger 112 is brought opposite a vane element corresponding to the respective adjustment of the correlated exposure control element, viz., the setting of the shutter in the example described. When the adjustment lever 139 is at rest and the intermediate member 136 is rotated, its plane of rotation is maintained through a slot guide shown at 140. In this manner the finger 112 when moved by the operation of the shutter release lever, by engagement with the actuating rod 135, always engages with the steps of a single vane element. A spring, not shown, may be provided for returning the member 136 to its initial position after disengagement with the actuating rod 135.

A further embodiment of a device of this type is shown in Figure 8, differing from the construction according to Figure 7 in that the finger 112 is constructed in stepped form, whereby the vane carried by the moving coil may consist of a single element. As shown, the surfaces of the stepped finger 112 and the vane 110 are preferably arranged at right angle. In this case the adjustment lever 139 serves for regulating the height of the opposed step in accordance with the setting of the correlated exposure control. In a construction of this nature, the heights of the steps should vary according to a logarithmic law so as to obtain practical results by mechanical addition. This makes it necessary to transmit the movement of the diaphragm setting ring upon the actuating rod by a properly constructed connecting mechanism, such as a lever 142, engaging a suitably curved slot 141 associated with the diaphragm setting ring, as shown. It is furthermore possible as is understood to utilize the adjustment of the lever 139 for adapting the shutter mechanism to other exposure controlling factors such as plates or films of different sensitivity.

According to a further constructional feature illustrated in Figure 9, the moving coil shaft 3 is provided with a simple abutment member cooperating with a stepped member manually adjustable in accordance with the selected shutter speed. The construction shown has the further advantage of reducing mechanical stress upon the axis of the moving coil device. The abutment member consists of a flat element 144 connected to the moving coil shaft through a leaf spring 143 and arranged for free movement opposite two fixed abutment elements 145 and 146 in the normal position. If the diaphragm setting ring 111 is rotated by operation of the shutter release lever in a manner similar as heretofore described, the stepped member 148 pivotally mounted about a shaft 149 is swung through the action of a guide slot 147 engaged by an opposite lever arm of the member 148, whereby the latter engages the element 144 with one of its steps dependent on the position of the element 144. Due to the resiliency of the leaf spring 143, the member 148 will press the element 144 firmly against the abutments 145 and 146, thus arresting and blocking the movement of the iris diaphragm. The steps of the member 148 not engaging the member 144 may pass freely between the abutments 145 and 146. When the diaphragm setting ring returns to its normal position, the element 144 disengages the members 145 and 146 through the action of the spring 143 so that the former is allowed to move freely again.

Referring to Figure 10, I have shown an arrangement for indicating the position of the abutment vane so as to inform the operator of the adjustment in advance of the operation of the shutter. Simultaneously the position of the correlated or manual exposure control means may be indicated by a suitable scale. When adjusting the independent or manual control means, such as in the example illustrated by rotation of the shutter speed setting ring 149, to a desired shutter speed, a scale 152 is simultaneously displaced by means of guide tracks 151 and a slot guide shown at 150. The scale 152 is provided with graduations indicating the automatically adjustable exposure control values, in the example chosen, the stop or diaphragm aperture numbers. I have furthermore shown an indicating disk 153 mounted on the axis 3 of the moving coil 1 properly balanced, such as by means of a balancing weight or the like. This indicator is eccentrically arranged and its marginal curve is designed in such a manner that its intersection with the scale 152 indicates the stop or aperture value which the diaphragm would automatically assume upon subsequent operation of the shutter at this instant.

As is understood, the mechanism for automatic exposure control of the above described characteristics may be used with any type of exposure adjusting device allowing a gradual or step-by-step control of correlated exposure control values. Moreover, it will be understood that either of a pair of exposure control elements may be embodied in the inventive device for automatic or manual adjustment and that the invention is not limited to the specific example of automatic iris control and manual shutter speed setting, it being obvious and within the scope of the invention to adjust the iris diaphragm manually and to connect a gradually adjustable shutter speed control element such as the shutter speed setting ring in shutters of well known type with the mechanism according to the invention.

As will be evident from the above description, the invention is not limited to the specific embodiments presented herein for illustration, but the underlying principle and inventive concept is susceptible of numerous modifications differing from the specific disclosure herein presented and coming within the broad scope and spirit of the invention as defined in the appended claims.

I claim:

1. In a photographic camera, a lens; an adjustable exposure control element for controlling the quantity of light passed through said lens; a shutter; shutter actuating means; an electrically actuated means; a stepped movable member controlled by said electrically actuated means and adapted to control the limit position to which said exposure control element may be adjusted; a light sensitive device adapted to vary the current in said electrically actuated means in accordance with the intensity of light passed through said lens; and means actuatable by said shutter actuating means for automatically adjusting said exposure control element to the limit position determined by said stepped member.

2. In a photographic camera, a lens; an exposure control element gradually adjustable between zero and a limit position for controlling the quantity of light passed through said lens; a shutter; shutter actuating means; an electrically actuated means; a stepped movable member controlled by said electrically actuated means and adapted to control the limit positions of said exposure control device in steps; a light sensitive means adapted to vary the current in said electrically actuated means in accordance with the intensity of the light passed through said lens; means actuatable by said shutter actuating means for automatically adjusting said exposure control element to the limit position determined by said stepped member prior to the initiation of the exposure; and means for returning said exposure control means to its initial position after each exposure.

3. In a photographic camera, a lens; an adjustable exposure control element for controlling the quantity of light passed through said lens; a shutter; shutter actuating means; means adjustable according to the intensity of the light passed through said lens; a stepped movable element controlled by said last means and adapted for controlling the adjusting limit of said exposure control element in successive steps; means actuatable by said shutter actuating means for automatically adjusting said exposure control element to the limit position determined by said stepped element prior to the initiation of an exposure; and means for restoring said exposure control element to its initial position upon completion of each exposure.

4. In a photographic camera, a lens; an adjustable iris diaphragm normally in open position for controlling the quantity of light passed through said lens; a shutter; shutter actuating means; an electrically actuated means; a stepped movable element controlled by said electrically actuated means and adapted to adjust variable limit positions of said diaphragm in successive steps; a light sensitive device adapted to vary the current in said electrically actuated means in accordance with the intensity of light passed through said lens; means actuatable by said shutter actuating means for automatically adjusting said diaphragm to the limit position determined by said stepped element prior to the initiation of an exposure; and means for returning said iris diaphragm to its normal position upon completion of each exposure.

5. In a photographic camera as claimed in claim 1 including means controlled by a predetermined step of said stepped member for blocking said shutter actuating means at a predetermined intensity of light passed through said lens.

6. In a photographic camera as claimed in claim 1 comprising signaling means controlled by a predetermined step of said stepped member corresponding to a predetermined intensity of the light passed through said lens.

7. In a photographic camera as claimed in claim 1 comprising signaling means controlled by the first and last step of said stepped member having a predetermined dimension dependent on insufficient and excessive intensity, respectively, of the light passed through said lens.

8. In a photographic camera as claimed in claim 1 comprising blocking means controlled by the first and last step of said stepped member having a predetermined dimension for preventing the actuation of the shutter dependent on insufficient and excessive intensity, respectively, of light passed through said lens.

9. In a photographic camera as claimed in claim 1 including a scale calibrated in adjusting values of said exposure control means and a movable index member having a marginal curve of predetermined configuration controlled by said electrically actuated means and in accordance with the light passed through said lens, said index member intersecting said scale to indicate the adjustment of said exposure control means in advance of the actuation of said shutter.

10. In a photographic camera having a lens; a shutter; shutter actuating means for controlling the quantity of light passed through said lens; means for controlling the quantity of light passed through said lens, said means comprising a shutter speed adjusting means and an iris diaphragm; diaphragm aperture adjusting means; an electrically actuated device comprising a magnet and a moving coil operatively associated therewith; a stepped rotatable member controlled by said moving coil; light sensitive means adapted to vary the current in said moving coil to adjust said stepped member in accordance with the intensity of light passed through said lens; means for actuating said diaphragm controlling means by said shutter actuating means prior to the initiation of an exposure; abutment means connected to said diaphragm controlling means and adapted to engage a step of said stepped member to limit the adjustment of said diaphragm by said shutter actuating means dependent on the position of said stepped member; and means for returning said diaphragm to its normal position by the return movement of said shutter actuating means upon completion of each exposure.

11. In a photographic camera as claimed in claim 10 including a plurality of stepped members each coordinated to a different shutter speed; means actuatable by said speed adjusting means to place one of said stepped members in operative position with said diaphragm controlling means prior to the initiation of an exposure.

12. In a photographic camera as claimed in claim 10 including a scale calibrated in diaphragm aperture values, said scale being arranged to be displaced in predetermined relation to said shutter speed adjusting means; and a movable index member of predetermined configuration controlled by said moving coil and variably intersecting said scale for indicating the adjustment of said iris diaphragm in advance of the actuation of said shutter.

13. In a photographic camera as claimed in claim 1 including means engaging said stepped member prior to its engagement with said abutment means for holding said stepped member in rigid position during its engagement with said diaphragm controlling means.

14. In a photographic camera having a lens; automatic means for adjusting the quantity of light passed through said lens in accordance with the light values of the object to be photographed; and means controlled by said automatic means to indicate unfavorable light conditions to prevent wrongly exposed pictures.

15. In a photographic camera having a lens; automatic means for adjusting the quantity of light passed through said lens in accordance with the light values of the object to be photographed; and blocking means controlled by said automatic means to prevent over exposed pictures.

JOSEF KARG.